(12) United States Patent
Iñaki et al.

(10) Patent No.: US 12,037,109 B2
(45) Date of Patent: Jul. 16, 2024

(54) AERIAL VEHICLES WITH UNCOUPLED DEGREES OF FREEDOM

(71) Applicant: FUNDACIÓN TECNALIA RESEARCH & INNOVATION, Derio (ES)

(72) Inventors: Iglesias Aguinaga Iñaki, Derio (ES); Lasa Aguirrebengoa Joseba, Derio (ES)

(73) Assignee: FUNDACIÓN TECNALIA RESEARCH & INNOVATION, Derio Bizkaia (ES)

( * ) Notice: Subject to any disclaimer, the term of this patent is extended or adjusted under 35 U.S.C. 154(b) by 253 days.

(21) Appl. No.: 17/298,099

(22) PCT Filed: Nov. 20, 2019

(86) PCT No.: PCT/EP2019/081888
§ 371 (c)(1),
(2) Date: May 28, 2021

(87) PCT Pub. No.: WO2020/109100
PCT Pub. Date: Jun. 4, 2020

(65) Prior Publication Data
US 2022/0001976 A1   Jan. 6, 2022

(30) Foreign Application Priority Data
Nov. 30, 2018   (EP) .................................. 18382880

(51) Int. Cl.
*B64C 27/52* (2006.01)
*B64C 27/08* (2023.01)
*B64C 27/20* (2023.01)

(52) U.S. Cl.
CPC .............. *B64C 27/52* (2013.01); *B64C 27/08* (2013.01); *B64C 27/20* (2013.01)

(58) Field of Classification Search
CPC ..... B64C 15/12; B64C 27/52; B64C 29/0033; B64C 37/02; B64D 5/00
See application file for complete search history.

(56) References Cited

U.S. PATENT DOCUMENTS 9,630,712 B1 *  4/2017  Carmack ................. B64C 27/08
2006/0016930 A1   1/2006  Pak
(Continued)

FOREIGN PATENT DOCUMENTS

WO   WO 2017/183551   10/2017
WO   WO 2018/106137   6/2018

OTHER PUBLICATIONS

Search Report and Written Opinion issued in corresponding PCT Application 11202105677Q, dated Feb. 23, 2023.
(Continued)

*Primary Examiner* — Joshua J Michener
*Assistant Examiner* — Arfan Sinaki
(74) *Attorney, Agent, or Firm* — NORTON ROSE FULBRIGHT US LLP

(57) ABSTRACT

An aerial vehicle that comprises a main frame and a plurality of operable multicopter units. Each multicopter unit has a plurality of propulsion units. The propulsion units are attached to the respective multicopter unit at a fixed roll angle, a fixed pitch angle and a fixed yaw angle. The plurality of operable multicopter units are attached to the main frame by interposition of respective joints and rotate relative to the main frame independently to each other. At least one of the joints has a minimum of one degree of freedom, such that the main frame has a at least the same or higher number of controllable degrees of freedom than the total number of degrees of freedom of the main frame.

8 Claims, 11 Drawing Sheets

(56) References Cited

U.S. PATENT DOCUMENTS

| 2009/0084890 | A1 | 4/2009 | Reinhardt | |
|---|---|---|---|---|
| 2013/0287577 | A1* | 10/2013 | Lin ..................... | B64C 39/024 |
| | | | | 416/210 R |
| 2018/0148169 | A1* | 5/2018 | Zhang ................ | B64C 29/0033 |
| 2020/0150693 | A1* | 5/2020 | Tomonaga ........... | B64C 39/024 |
| 2021/0064062 | A1* | 3/2021 | Katayama ............ | B64U 10/13 |
| 2022/0048618 | A1* | 2/2022 | Morris ................ | B64C 11/001 |

OTHER PUBLICATIONS

International Search Report and Written Opinion issued in Corresponding PCT Application No. PCT/EP2019/081888, dated Feb. 21, 2020.

* cited by examiner

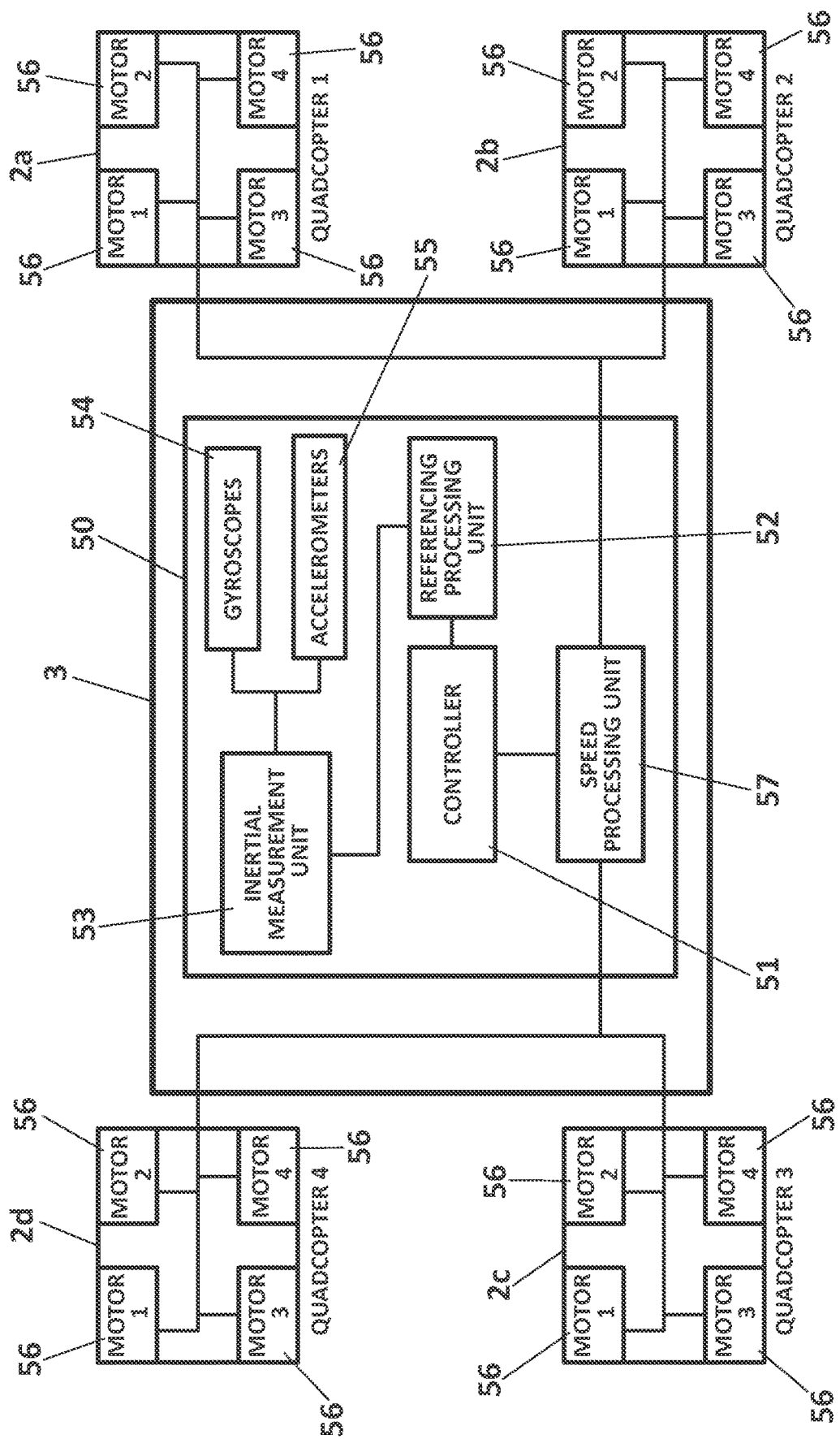
FIG. 9 (amended)

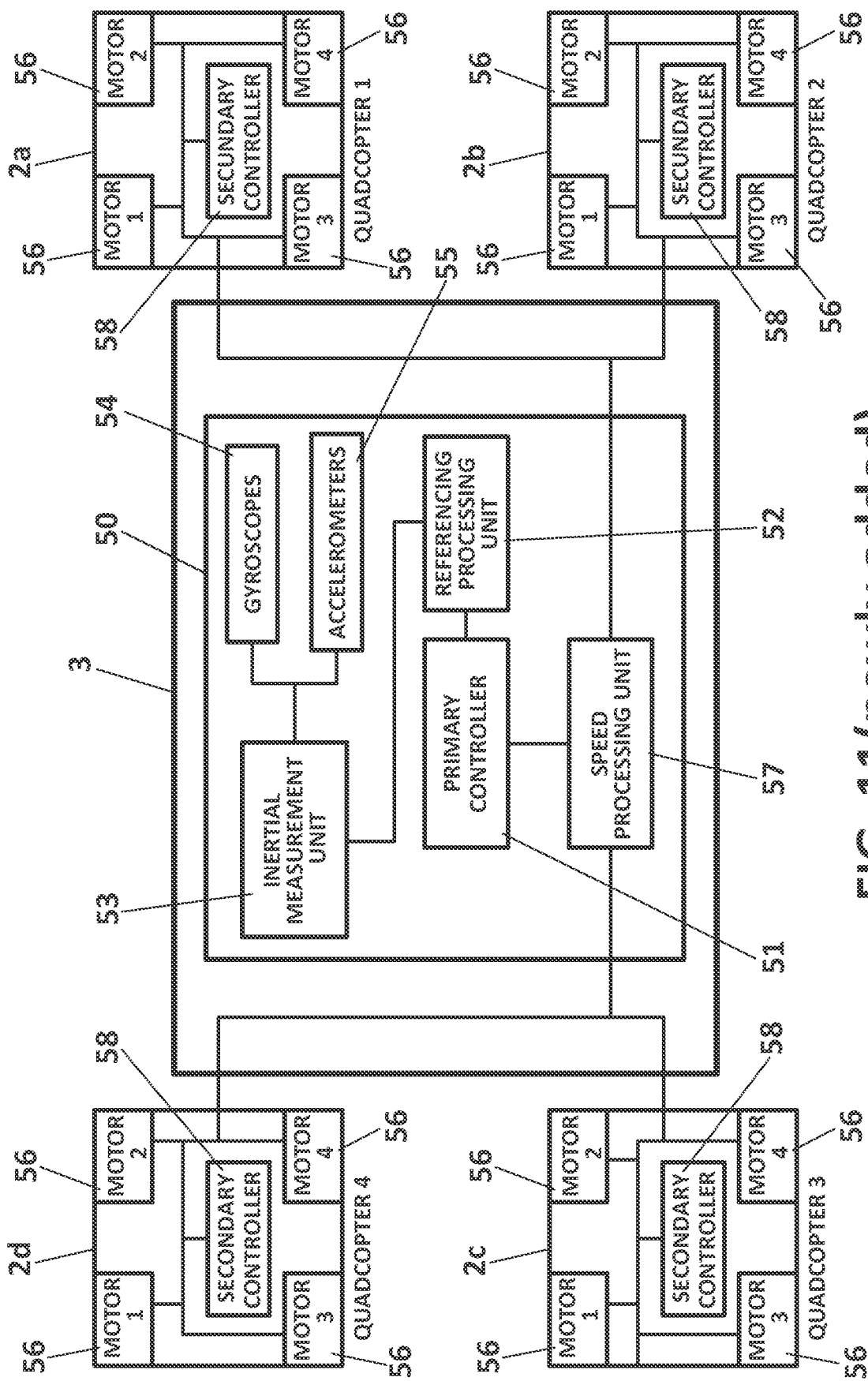
FIG. 11(newly added)

AERIAL VEHICLES WITH UNCOUPLED DEGREES OF FREEDOM

The present application is a national phase application under 35 U.S.C. § 371 of International Application No. PCT/EP2019/081888, filed Nov. 20, 2019, which claims the benefit of priority to European Patent Application No. 18382880.5, filed Nov. 30, 2018, the entire contents of each of which are hereby incorporated by reference in their entirety.

TECHNICAL FIELD

This invention is related to the field of manned and unmanned aerial vehicles and more particularly to aerial vehicles having uncoupled Degrees-Of-Freedom (DOF) being formed by a plurality of multicopters coupled to a central body where the performance of the plurality of multicopters provides the aerial vehicle with uncoupled DOF.

BACKGROUND OF THE INVENTION

An Unmanned Aerial Vehicle (UAV) is an aircraft without a human pilot. A manned aerial vehicle is an aircraft with a human pilot that at least manage some of the functionalities of the aircraft. Drones may be manned or unmanned aerial vehicles and may be remotely controlled by a remote control using, e.g., a radio signal, or, may be an autonomous drone implementing an onboard computer system. One example of drone is a multicopter.

As used herein, multicopters may refer to any aircraft, whether manned or unmanned and remotely or autonomous controlled, that flies using any number of propulsion units (e.g. propellers, rotors, turboprop engines, jet engines, etc.) greater than one. Examples of multicopters include, but are not limited to, bicopters (two propulsion units), tricopters (three propulsion units), quadcopters (four propulsion units), hexacopters (six propulsion units), octocopters (eight propulsion units) and others. The motion of the multicopter may be controlled by changing the relative thrust generated by each propulsion unit. Specifically, motion about the three symmetry axes of the multicopter, known as roll (rotation about the front-back axis), pitch (rotation about the side-side axis), and yaw (rotation about the vertical axis), can each be controlled by changing the relative thrust generated by each propulsion unit. For example, roll and pitch can be achieved by increasing thrust in the propulsion units located on one side and reducing thrust in the propulsion units located on the other side, while yaw can be achieved by increasing thrust in the propulsion units that are located diagonally across from each other. Horizontal motion may be achieved by causing the multicopter to lean towards the intended direction of travel, and vertical motion is achieved by simultaneously increasing thrust in each propulsion unit (ascent), or by simultaneously decreasing thrust in each propulsion unit (descent).

The use of multicopters is becoming increasingly popular over the last few years and as the technology becomes mature, new applications for the multicopters are appearing. For example, the use of multicopters for transporting large-size items or people are some applications that are beginning to be considered.

However, applying existing multicopter architectures to the new applications is leading to new problems which have not been solved yet. One of these problems is that existing multicopters with fixed propulsion units do not have all their DOF uncoupled (movements in planes X, Y and Z, yaw, roll and pitch are not uncoupled) so these multicopters cannot perform certain movements without having to considerably increase the number of propulsion units that they incorporate and therefore the weight and complexity of the multicopter.

Having aerial vehicles with DOF that are uncoupled, in other words, with DOF which are independent from each other, provides at least two main advantages. The first advantage is that the efficiency of the aerial vehicles is increased. By being able to move with DOF that are uncoupled, intermediate movements that are not necessary for moving the aerial vehicle from a first point to a second point are avoided and thus, energy is saved. In addition, a greater efficiency in flight is obtained by being able to direct the aircraft in the direction of minor loss of energy seeking to maximize aerodynamic efficiency. The second advantage is that motion accuracy as well as control, maneuverability and stability of the aerial vehicle are increased. The increase in motion accuracy allows aerial vehicles with independent DOF to perform tasks, e.g., precision handling of sensitive loads, precision landings, etc., that existing multicopters with interdependent DOF cannot. It also allows the aircraft to be provided with extended manoeuvrability that may be critical in missions where flight conditions are changing (gusty wind, variable or mobile payload) or where this extended manoeuvrability is necessary for certain manoeuvres or complex and very demanding flight dynamics.

In order to provide aerial vehicles with independent DOF, some existing multicopters have rotors coupled to their main bodies with servo-actuators to allow tilting the propulsion units relative to the main bodies. However, using servo-actuators to precisely control the inclination of the propulsion units increments the complexity of the architecture, adds weight to the multicopters, increase manufacturing and maintenance costs and reduces safety and reliability.

DESCRIPTION OF THE INVENTION

For overcoming the mentioned drawbacks, the present invention discloses an aerial vehicle with uncoupled degrees of freedom and a method for manoeuvring the aerial vehicle.

The aerial vehicle comprises a main frame and a plurality of operable multicopter units. Each operable multicopter unit of the plurality of operable multicopter units has a plurality of propulsion units that are be attached thereto at a fixed yaw angle, at a fixed roll angle and at a fixed pitch angle, in other words, the propulsion units may be fixed to the multicopter body. The thrust applied by each one of the propulsion units may be different from each other. Thus, the plurality of propulsion units of a multicopter unit may be configured to apply a common direction of thrust but a different thrust magnitude. Examples of propulsion units may include, but are not limited to, propellers, rotors, turboprop engines, jet engines, etc. The main frame has a plurality of arms fixedly coupled thereto and extending radially therefrom. Each operable multicopter unit of the plurality of operable multicopter units is attached to the main frame by interposition of one single joint such that the operable multicopter units rotate relative to the main frame independently from each other. At least one of these joints has a minimum of one DOF, such that the main frame, i.e. the aerial vehicle, has a number of Controllable Degrees Of Freedom (CDOF) equal or higher than the total number of DOF of the main frame. Preferably, the joints may have a number of DOF between one and three although in some implementations some of the joints may be fixed.

As used herein, the CDOF may refer to the maximum number of directional control variables that can be manipulated simultaneously during flight of an aerial vehicle.

In a three-dimensional space, the maximum number of DOF of a solid rigid is six. Although a solid rigid may present configurations with a number of DOF less than six, the solid rigids having a total number of six uncoupled DOF are provided with the highest possible control. Therefore, the number of directional control variables that can be simultaneously manipulated in the aerial vehicle with uncoupled DOF herein disclosed may be equal or higher than the six DOF of the main frame (and thus of the aerial vehicle as a whole). The six DOF of the main frame are the longitudinal movements in directions X, Y and Z and the rotational movements yaw, roll and pitch. Then, there will be the same number or more CDOF of the main frame (and thus, of the aerial vehicle) than the total number of the DOF of the rigid solid that is to be moved (the aerial vehicle). In this way, each DOF of the aerial vehicle may be moved independently.

Depending on the architecture of the aerial vehicle (number of multicopter units, number of propulsion units in each multicopter unit and number of DOF of the joints) the aerial vehicle may have more or less CDOF. The aerial vehicle has a holonomic architecture when the number of CDOF is equal to the total number of DOF of the solid rigid and a redundant architecture when the number of CDOF is higher than the total number of DOF of the rigid solid. In these redundant architectures, the redundant CDOF, i.e. those additional CDOF over the total number of DOF of the rigid solid, can be varied without varying any of the others CDOF of the aerial vehicle. The redundant CDOF increase security, provide safe modes of failure, provide modes of operation that conventional drones cannot, etc.

The additional CDOF of the aerial vehicle herein described (compared to a conventional drone with only 4 CDOF to generate a total of six DOF in its main structure) allow commanding different setpoints (different tilt angles and thrusts) for each of the multicopter units, developing dynamic modes of operation not currently available in existing drones, such as stability modes in which the modules are placed at a certain tilt angle and the counteracting forces give stability to the aircraft against wind gusts, or modes in which a coordinated movement of all the modules results in a movement in X or Y without varying any of the other DOF. It also allows having the necessary redundancy so that even if some propulsion units fail, the aerial vehicle can maintain a minimum of six CDOF to generate the six DOF in its main structure.

For example, for aerial vehicle architectures with the centre of gravity symmetrically arranged with respect to the forces generated by the multicopter units, the basic modes of moving forward, backward, left and right can be generated by simply developing the same forces in each one of the multicopter units, as each multicopter unit would be positioned at the same tilt angle with the same thrust force being applied. The aerial vehicle would move depending on the thrust generated and the tilt angle at which the multicopter units are being operated.

In some examples, all the multicopter units may be attached to the main frame via one joint with at least one DOF. However, in some other examples, some of the multicopter units of the plurality of multicopter units may be fixed to the main frame, i.e., by interposition of joints with no DOF relative to the main frame. In some other examples, the number of DOF of each joint of the plurality of joints in the aerial vehicle may different from each other.

In some examples, the joints may have a maximum of three DOF. For example, joints with three DOF may be spherical joints. These spherical joints linking each multicopter unit to the main frame can allow up to 3 rotational degrees of freedom (X-turn, Y-turn and Z-turn), and enable precise positioning of each of the modules relative to the main frame allowing the aerial vehicle to perform movements that currently cannot be performed by existing drones (e.g. movement in X axis without modifying the roll and pitch or other precise manoeuvres).

In some examples, the main frame may have a plurality of arms extending radially therefrom and each operable multicopter unit may be attached to a corresponding arm of the plurality of arms. Thus, the joints may be located in proximity to the free ends of the arms such that the multicopter units are coupled to the frame via the respective free ends of the arms.

In some examples, the joints may comprise a quick release system such that the plurality of operable multicopter units is releasable attached to the main frame. For example, the joints may have an upper portion attached to the multicopter unit a lower portion attached to the main frame such that the quick release system may allow releasing the upper portion form the lower portion of the joint. Having multicopter units releasably attached to the main frame facilitates the maintenance operations of the aerial vehicle and allows scalability of the aerial vehicle since the currently operated multicopter units can be easily and quickly replaced with different multicopter units.

In some examples, the joints may comprise locking mechanisms configured to restrict movement of the joints in at least one DOF. These joints with restricted DOF may be useful for specific applications where not all the DOF are required to be uncoupled, or where specific DOF are not necessary.

In some examples, the joints may comprise blocking mechanisms configured to temporarily block movement of the joints in at least one DOF. These joints with temporary blocked DOFs may be useful for cruise modes where it is desired to ensure that the joint maintains its position independently of external disturbances.

In some examples, the joints may comprise shock absorbing mechanism configured to absorb shock impulses generated by the movement of the multicopter unit relative to the main frame. These joint with shock absorbing means may improve stability and accuracy.

In some examples, the joints, which are able to move the angular DOF independently form each other without modifying their position in X, Y and Z axes, may be selected from a group comprising spherical joints, cardan joints, ball joints, constant velocity joints and any combination thereof. Besides, the joints may be a combination of joints with less than three DOF to provide a combined joint with up to three DOF. For example, the joint may be a combination of two or three consecutive cylindrical joints to provide two or three DOF, respectively.

In some examples, the plurality of operable multicopter units are equidistantly located relative to a central point of the main frame. In this way, the stability of the aerial vehicle is maximized. In some other examples, and depending on the purpose and the particular architecture of the aerial vehicle, the multicopter units may be attached to the main frame with a different distribution.

In some examples, the aerial vehicle may comprise a referencing processing unit located on the main frame. This referencing processing unit may be further configured to determine a displacement of the main frame relative to a horizontal plane. Preferably, the referencing processing unit may be communicatively coupled to an inertial measurement unit and a plurality of accelerometers and/or gyroscopes positioned on the main frame. The referencing of the main frame allows an accurate control of the flight of the aerial vehicle, since tilt relative to the horizontal plane may achieve directional thrust of the aerial vehicle and also allows adapting the flight to the environmental conditions.

In some examples, the aerial vehicle may comprise a controller located in the main frame and configured to operate the plurality of multicopter units. This controller may be communicatively coupled to the referencing processing unit to receive information about the orientation of the main frame and the current direction of travel. In this way, the controller with the information about the current orientation, current direction of travel and the intended direction of travel of the aerial vehicle is able to operate the multicopter units to alter the direction of travel of the aerial vehicle towards the intended direction of travel. To do this, the controller operates the multicopter units by altering the thrusts of the propulsion units of each multicopter unit that modifies the orientation of the multicopter units relative to the main frame via the joints and thus, modifies the direction of travel of the aerial vehicle.

Preferably, the controller may include an airflow measurement unit for determining airflow information data across the aerial vehicle. This airflow information data may be used by the controller to determine the operations to be performed on the multicopter units.

In some other examples, the aerial vehicle may comprise a primary controller located in the main frame and a plurality of secondary controllers, each secondary controller being located in a corresponding multicopter unit. The plurality of secondary controllers may be configured to operate the respective multicopter units and the primary controller may be configured to manage the plurality of secondary controllers. This primary controller may be communicatively coupled to the referencing processing unit to receive information about the orientation of the main frame. The secondary controllers may be communicatively coupled to the primary controller. In this way, the primary controller with the information about the current orientation, current direction of travel and the intended direction of travel of the aerial vehicle is able to determine a direction to be taken by the aerial vehicle. The primary controller may transmit the direction to be taken by the aerial vehicle to the secondary controllers such that each secondary controller may operate the respective multicopter unit to direct the aerial vehicle in the direction to be taken. For example, each secondary controller may alter the thrust of the propulsion units of the corresponding multicopter unit modifying the orientation of the multicopter unit relative to the main frame via the respective joint and thus, modifying the direction of travel of the aerial vehicle.

In some examples, a method for manoeuvring an aerial vehicle as previously disclosed is described. The method may comprise determining, by the referencing processing unit, a displacement of the aerial vehicle relative to a horizontal plane. Then, the controller may determine a set point or thrust vector, i.e., a thrust magnitude and a tilt angle (yaw, roll and pitch angles), for the aerial vehicle based on the determined displacement. The controller may adjust the thrust of each multicopter unit based on the determined thrust. The controller may further adjust the tilt angle, i.e., yaw, roll and pitch, of the plurality of multicopter units by performing a rotational movement of each multicopter units relative to the main frame via the respective joints, the relative rotational movement being based on the tilt angle determined for the aerial vehicle. The sum of the thrust vectors in the plurality of multicopter units will be equal to the calculated thrust vector of the aerial vehicle to perform a certain manoeuvre. This example provides a centralised management of the aerial vehicle.

In some examples, the aerial vehicle may have a primary controller attached to the main frame and a secondary controller attached to each multicopter unit. The plurality of secondary controllers may be to operate the respective multicopter units and the primary controller may be to manage the plurality of secondary controllers. After determining the displacement of the aerial vehicle, the primary controller may determine the thrust and the tilt angle for the aerial vehicle based on the determined displacement. Each one of the secondary controllers, upon reception of the thrust and tilt angle for the aerial vehicle from the primary controller, may determine and adjust the particular thrust of the multicopter unit on which the secondary controller is mounted based on the thrust determined previously for the aerial vehicle. Each secondary controller may further determine and adjust the tilt angle of the respective multicopter unit by performing a rotational movement of the multicopter unit relative to the main frame via the joints, the relative rotational movement being based on the tilt angle previously determined for the aerial vehicle. The sum of the thrust vectors of the plurality of multicopter units will be equal to the calculated thrust vector of the aerial vehicle to perform a certain manoeuvre. This example provides a decentralised management of the aerial vehicle.

In some examples, the aerial vehicle may have a plurality of controllers configured to operate any one of the plurality of multicopter units. Then, one of the controllers may determine and define the set point, i.e., thrust and tilt angle, for the aerial vehicle based on the displacement previously determined. After that, any one of the plurality of controllers, the same controller which has determined the set point for the aerial vehicle or any other controller within the aerial vehicle, may determine and adjust the thrust of the plurality of multicopter units based on the thrust of the aerial vehicle. One of the plurality of controllers may further determine and adjust the tilt angle of the plurality of multicopter units by performing a rotational movement of the multicopter units relative to the main frame via the joints, the relative rotational movement being based on the determined tilt angle. The sum of the thrust vectors of the plurality of multicopter units will be equal to the thrust vector of the aerial vehicle. This example provides a distributed management of the aerial vehicle in which any one of the plurality of controllers may take control over the aerial vehicle in case the controller currently in charge of managing the aerial vehicle fails. This control redundancy increases security and reliability of the aerial vehicle.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

BRIEF DESCRIPTION OF THE DRAWINGS

To complete the description and in order to provide a better understanding of the invention, a set of drawings is provided. Said drawings form an integral part of the description and illustrate embodiments of the invention, which should not be interpreted as restricting the scope of the invention, but just as an example of how the invention can be carried out. The drawings comprise the following figures:

FIG. 9 shows an example control system for managing the aerial vehicle of FIG. 1.

FIG. 11 shows another example control system for managing the aerial vehicle of FIG. 1.

DESCRIPTION OF A MODE OF EMBODIMENT OF THE INVENTION

Figure 1:
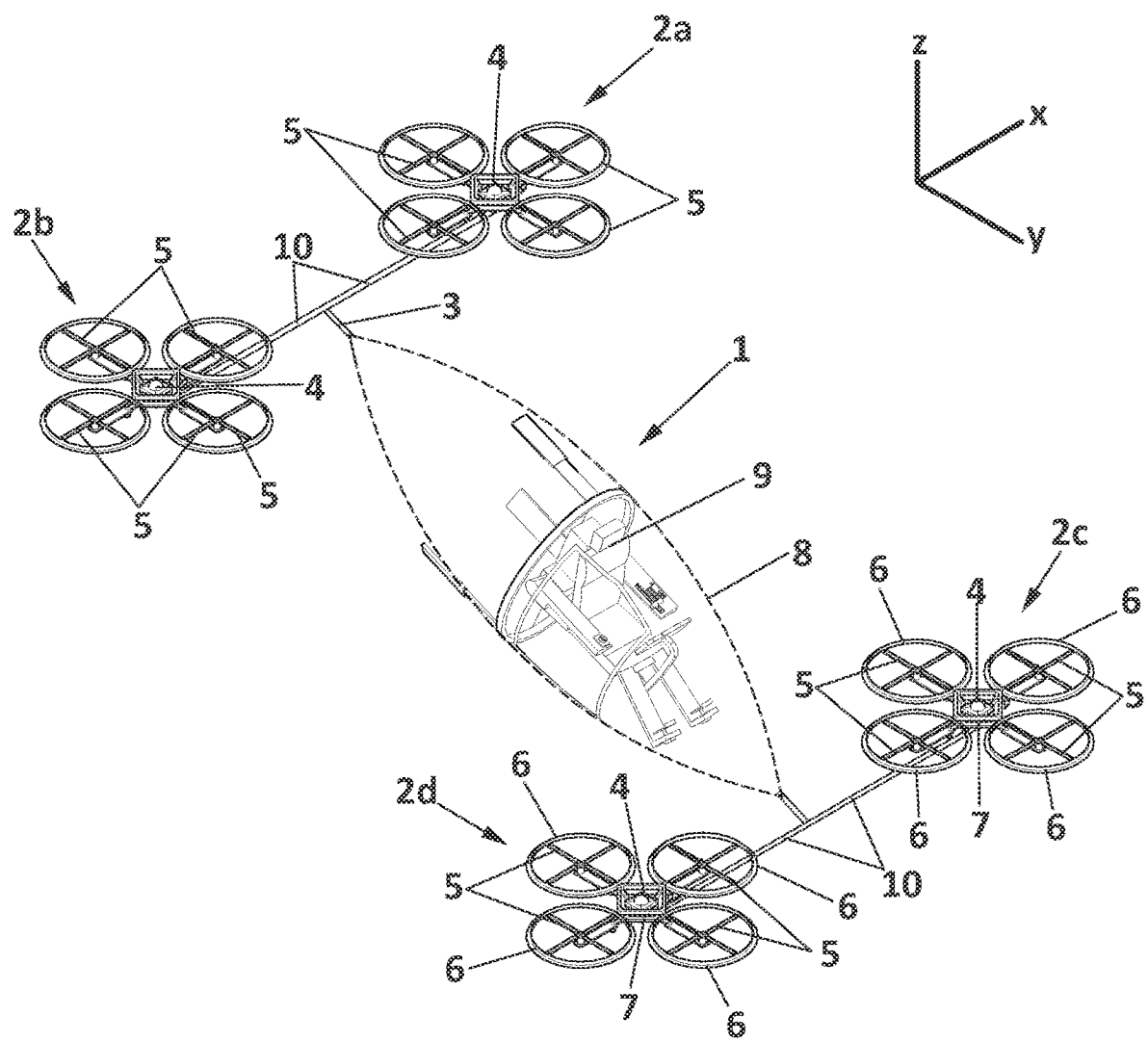
FIG. 1 shows an example aerial vehicle with uncoupled DOF with four quadcopters attached to the main frame by interposition of respective joints.

Referring to FIG. 1, there is illustrated an example aerial vehicle 1 with uncoupled DOF having four quadcopters 2a-d attached to an elongated main frame 3 by interposition of joints 4, for example ball joints, having three DOF. It should be understood that the example aerial vehicle 1 may include additional components and that some of the components described herein may be removed and/or modified without departing from a scope of the example aerial vehicle 1. Additionally, implementation of example aerial vehicle 1 is not limited to such example as shown in FIG. 1.

The quadcopters 2a-d are attached to the main frame 3 by interposition of the joints 4 providing the main frame 3 with six uncoupled DOF. In particular, the main frame 3 has six DOF and each one of the ball joints 4 provides three additional CDOF such that the main frame 3 is provided with sixteen CDOF. Each one of the quadcopters 2a-d has four fixed propulsion units 5, e.g. rotor blades, attached to respective rotor frames 6 in the main body 7 of the quadcopter 2a-d.

These operable rotor blades 5 provide aircraft functionalities to the aerial vehicle 1. In particular, the rotor blades 5 are to provide lift during vertical manoeuvring of the aerial vehicle 1 and directional thrust for horizontal displacements. In some examples, the aerial vehicle 1 may comprise a pair of rotor blades 5 within the rotor frames 6 provided as upper and lower rotor blades, for accurate thrust control.

Each quadcopter 2a-d, in addition to the rotor blades 5, further comprises a motor (not shown), e.g. a brushless motor, associated with the rotor blade 5, and a speed processing unit (not shown) to relay signals to the motors in the quadcopters 2a-d that determine how fast to spin. Alternatively, the quadcopters 2a-d may comprise a torque processing unit instead of the speed processing unit to relay signals to the motors determining how fast to spin. At any time, each one of the motors in a particular quadcopter 2, and thus the respective rotor blades 5, could be spinning at a different speed to provide different thrusts. Alternatively, the main frame 3 may comprise a centralised speed processing unit which is in communication with each one of the motors of the quadcopters 2a-d. Such arrangements provide an excellent thrust output, thereby achieving the maximum possible lift capability for the aerial vehicle 1. While in FIG. 1, the quadcopters 2a-d comprise rotor blades 5 for providing aircraft functionalities, alternative propulsion units could be envisaged, for example, in the use of propellers, turbo-prop engines or adjustable jet engines.

The aerial vehicle 1 also comprises at least one controller (not shown) to operate the quadcopters 2 based on the intended direction of travel. This at least one controller operates, via the speed processing unit, the rotor blades 5 by modifying their relative speed such that the position of each one of the quadcopters 2 relative to the main frame 3 can be independently modified, and therefore the thrust vector generated by each quadcopter. Thus, the at least one controller is configured to determine the relative position of each one of the quadcopters 2 independently of the relative position of the rest of quadcopters 2 and the main frame 3 in the aerial vehicle 1. In this way, the at least one controller may determine a different setpoint (thrust and tilt angles, roll, pitch and yaw) for each one of the quadcopters 2 providing the aerial vehicle 1 with additional operation modes other than basic operation modes (these basic operation modes are those movements performed by an aerial vehicle having a common setpoint for all its multicopter units). Examples of these additional operation modes are stability modes in which multicopters are with inverse rotor angle such that forces generated by the multicopters counteract each other increasing the stability of the aircraft, precision modes due to the increased manoeuvrability of the aerial vehicle with uncoupled DOF or efficient cruising modes in which the multicopter units can be positioned in its cruising position but at the same time maintaining the capsule in a position that minimizes aerodynamic drag.

The aerial vehicle also has an airframe body 8 attached to the main frame 3. In such example, the airframe body 8 is a capsule for transporting a user or passenger, so the capsule 8 incorporates a seat 9 for the user. The main frame 3 has four arms 10 located in pairs at both ends of the main frame 3. Each one of these arms 10 has, in proximity to their free ends, a corresponding ball joint 4 to attach the respective quadcopter 2 to the main frame 3. In some examples and depending on the geometry of the main frame 3, the arms 10 may extend from a centre of the aerial vehicle 1 to radial points of the main frame 3.

The main frame 3 and the airframe body 8 may be releasably attached, or may be integrally formed with one another. The airframe body 8 may also comprise a structure to carry other elements such as batteries, different kind of payloads, etc.

Although FIG. 1 shows an aerial vehicle 1 formed by four quadcopters 2, it will be apparent that any other suitable aerial vehicle architecture, including any number of multicopter units arranged to the main frame and any number of propulsion units arranged to each multicopter unit may be utilised to provide the multicopter functionality to the aerial vehicle 1. In addition, although FIG. 1 shows the four quadcopters 2 linked to the main frame 3 via ball joints 4, other kind of joints with among one and three DOF may be used. Besides, the joints may be different from each other having different number of DOF among them. In some implementations, some of the joints may be fixed joints.

Figure 2A:
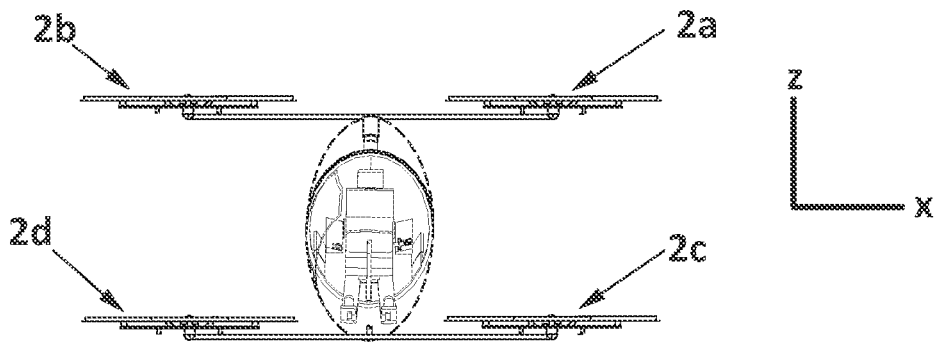
FIGS. 2A-C show a front view, a side view and a plant view of the example aerial vehicle of FIG. 1, respectively, with the four quadcopters positioned and operated to cause the aerial vehicle to hover.
Figure 2B:
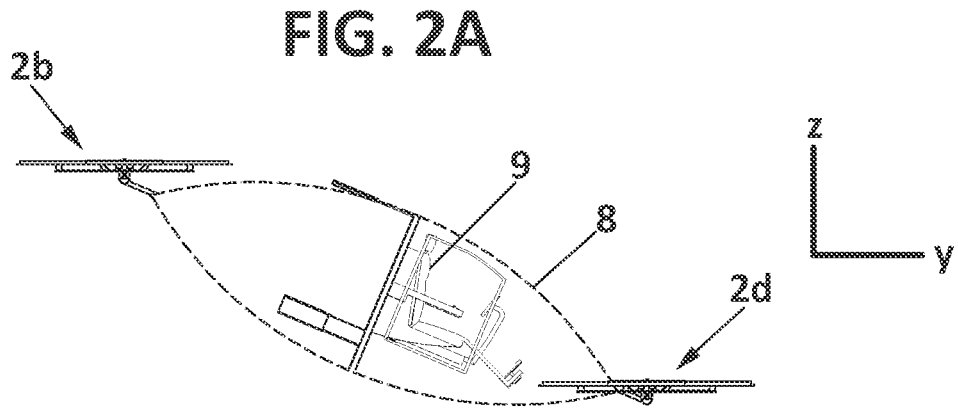
Figure 2C:
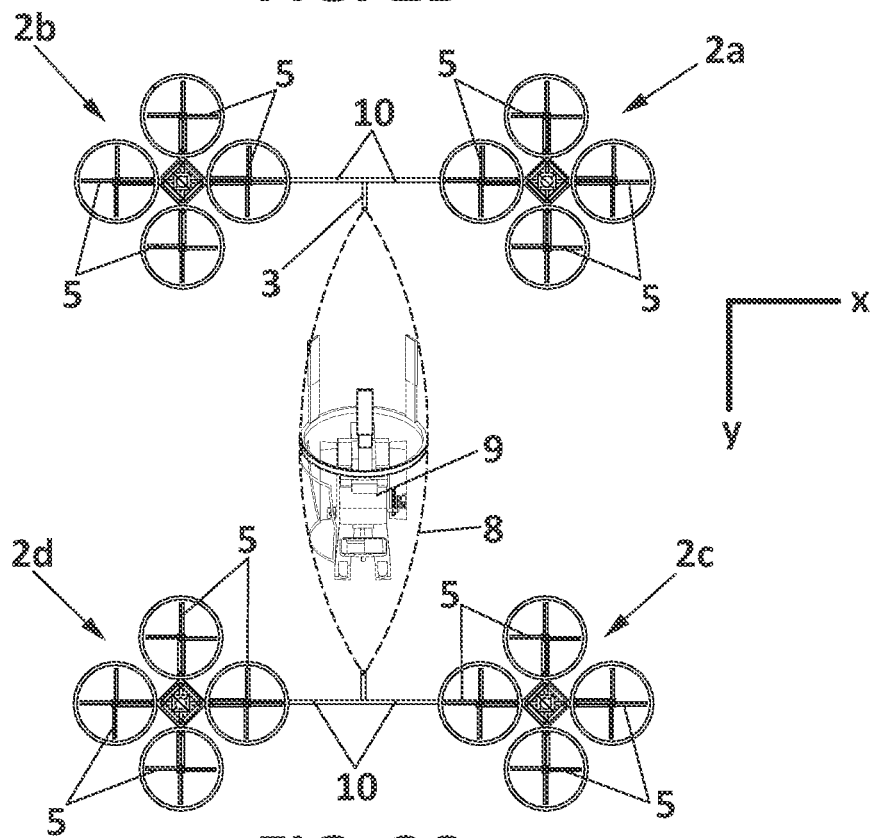

FIGS. 2A-C show a front view, a side view and a plant view of the example aerial vehicle of FIG. 1, respectively, with the four quadcopters positioned and operated to cause the aerial vehicle to hover.

Figure 3A:
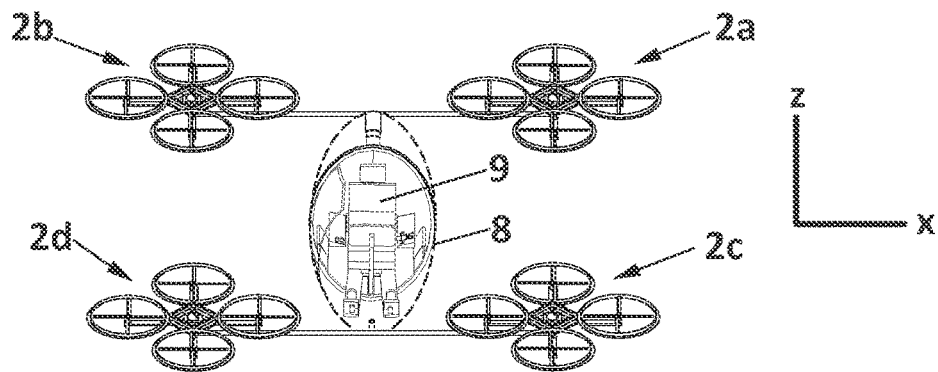
FIGS. 3A-C show a front view, a side view and a plant view of the example aerial vehicle of FIG. 1, respectively, with the four quadcopters positioned and operated to cause the aerial vehicle to cruise.
Figure 3B:
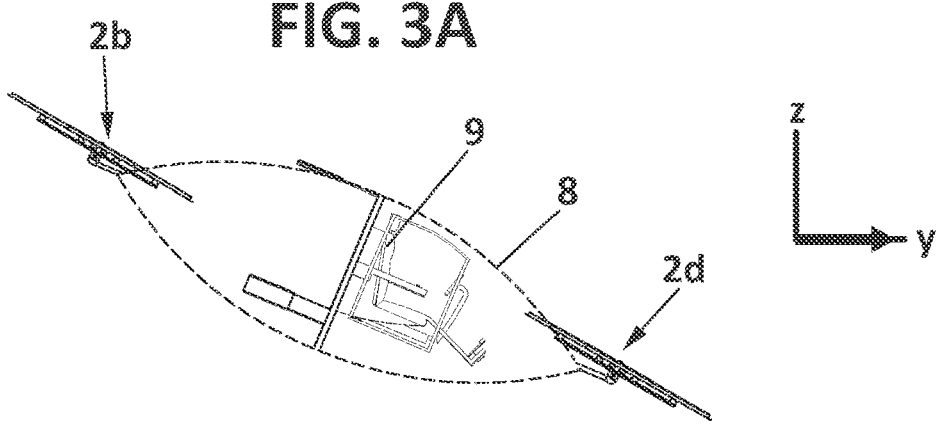
Figure 3C:
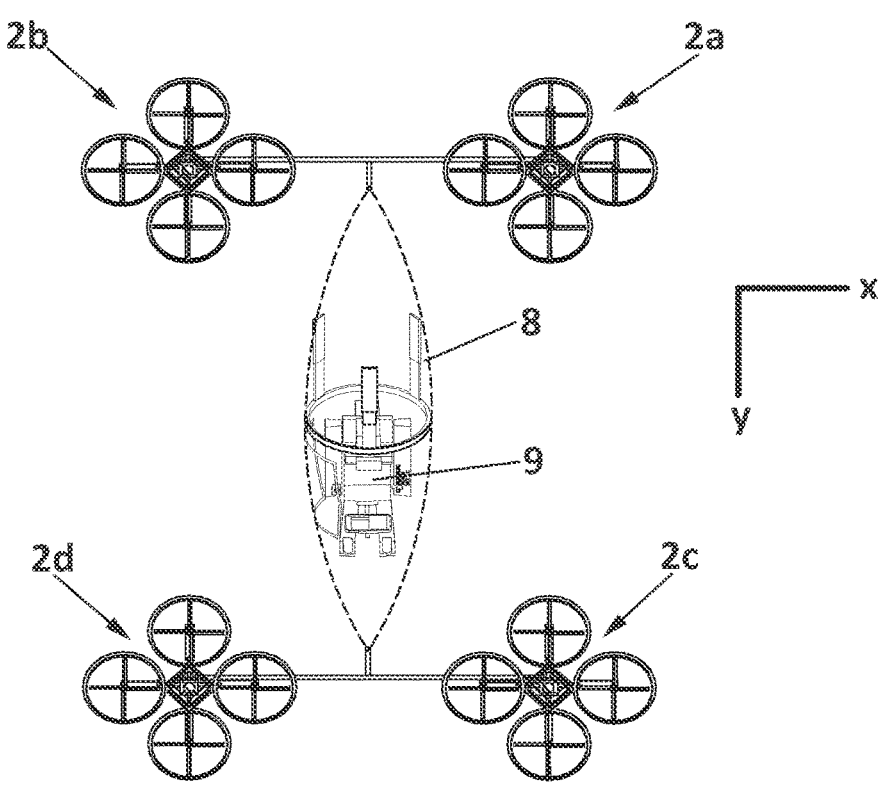

In such example, the four quadcopters 2*a-d* are positioned relative to the main frame 3 and operated to cause the aerial vehicle 1 to hover, i.e., to stay in the same position while airborne. In such example, the quadcopters 2*a* and 2*b* are positioned in a first common plane while quadcopters 2*c* and 2*d* are positioned in a second common plane different from the first plane. As shown more in detail in FIG. 2B, both planes are substantially horizontal planes parallel to each other, and the distance between both planes is such that the capsule 8 and thus, the seat 9, is positioned in a substantially vertical position for the passenger. The quadcopters 2*a* and 2*b* generate a first thrust vector (thrust magnitude and tilt angle, i.e., yaw, roll and pitch angles) and quadcopters 2*c* and 2*d* generate a second thrust vector, the first thrust magnitude being different form the second thrust magnitude, and the sum of the thrust vectors generated by the four quadcopters 2*a-d* is the thrust vector necessary for maintaining the aerial vehicle 1 in equilibrium and maintaining the same position for the passenger. In such example, the centre of gravity is centred on the aerial vehicle 1, and thus, the thrust is purely vertical. This position of the quadcopters 2*a*-2*d* relative to each other can be also used for ascending operations when the rotor thrust is increased with the same magnitude in all the rotors 5 of the aerial vehicle 1 and for descending operations when the rotor thrust is decreased with the same magnitude in all the rotors 5 of the aerial vehicle 1. FIGS. 3A-C show a front view, a side view and a plant view of the example aerial vehicle of FIG. 1, respectively, with the four quadcopters positioned and operated to cause the aerial vehicle to cruise.

In such example, the four quadcopters 2*a-d* are positioned relative to the main frame 3 and operated to cause the aerial vehicle 1 to cruise, i.e., to perform a horizontal movement in a particular direction (see arrow in FIG. 3B in Y-axis direction) and with the same thrust in all the quadcopters 2*a-d*. In such example, the quadcopters 2*a-d* are positioned in the same plane, said plane being at particular angle relative to the horizontal plane. The controller operates all the quadcopters 2*a-d* to rotate relative to their respective ball joints 4 such that their thrust vectors (thrust magnitude and tilt angle) relative to the main frame 3 is the same. Eventually, the thrust generated by the rotors 5 may be modified depending on the cruise speed needed. In some other examples, the quadcopters 2*a-d* may be rotated via their respective ball joints with a different tilt angle relative to the main frame 3 such that the direction of travel may be different, e.g., the quadcopters 2*a-d* may left rotated with the same angle relative to the main frame 3 and the same thrust to direct the aerial vehicle 1 in such direction.

Figure 4A:
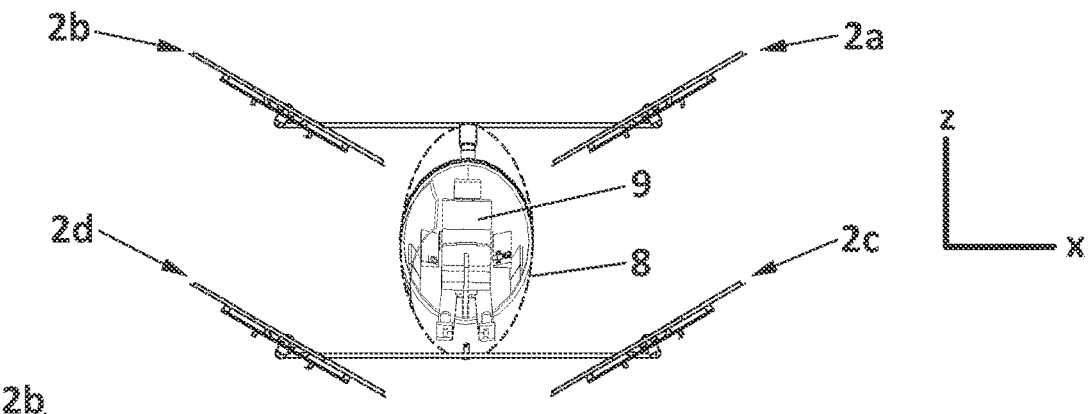
FIGS. 4A-C show a front view, a side view and a plant view of the example aerial vehicle of FIG. 1, respectively, with the four quadcopters positioned and operated to cause the aerial vehicle to hover with the downwash towards its exterior in stability mode.
Figure 4B:
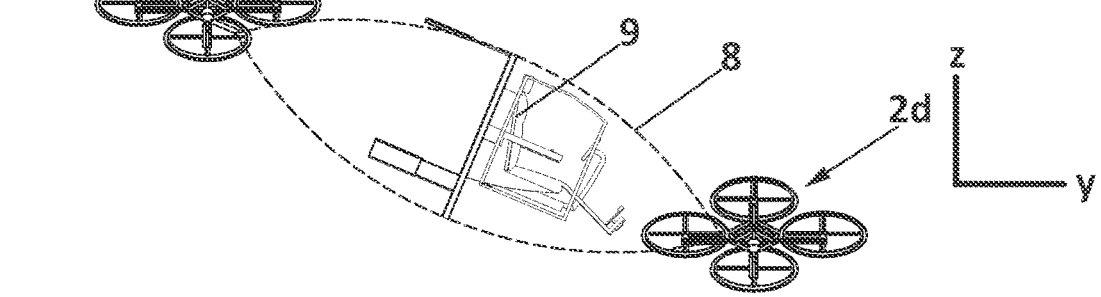
Figure 4C:
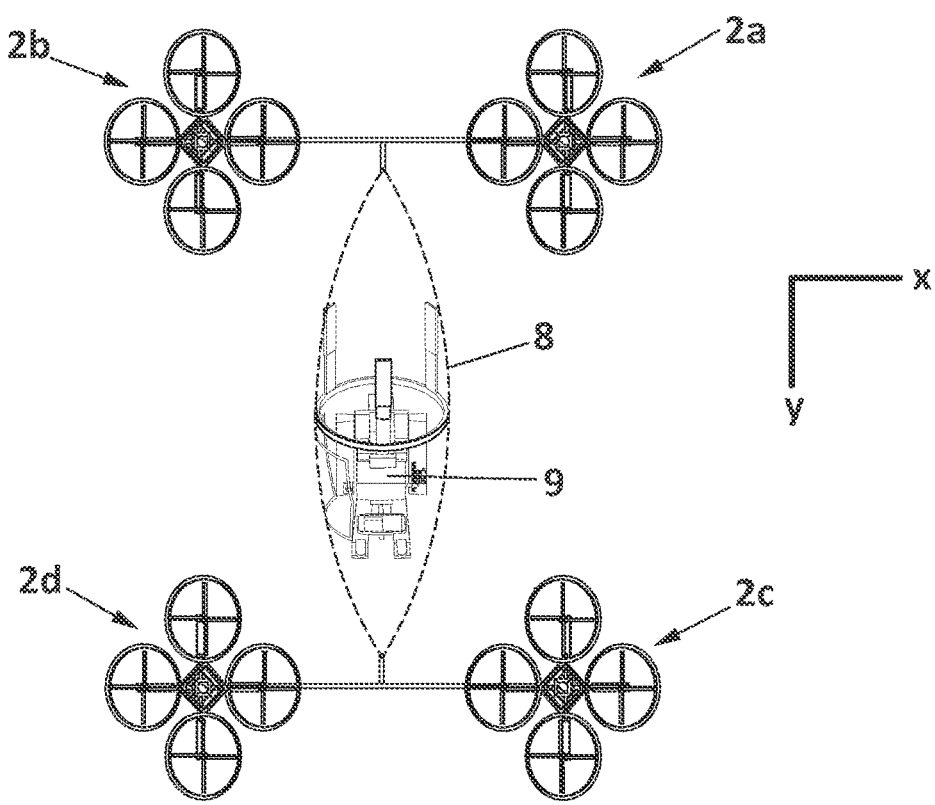

FIGS. 4A-C show a front view, a side view and a plant view of the example aerial vehicle of FIG. 1, respectively, with the four quadcopters 2*a-d* positioned and operated to cause the aerial vehicle 1 to hover and with the downwash towards its exterior in stability mode.

In such example, the quadcopters 2*a-d* are all inclined the same angle towards the centre of the main frame 3. Thus, each quadcopter 2*a-d* is positioned in a different plane but inclined with the same angle relative to the horizontal plane. The controller operates all the quadcopters 2*a-d* to rotate relative to their respective ball joints 4 such that their thrust magnitude is same and the tilt angle relative to the horizontal plane is the same but with quadcopters 2*a* and 2*b* and quadcopters 2*c* and 2*d* oriented opposite 5 to each other. In some other examples, the controller may operate the quadcopters 2*a-d* to rotate relative to their respective ball joints to be positioned forming the complementary angle to that shown in FIG. 4 such that the quadcopters 2*a-d* are all inclined away from the centre of the main frame 3. In some other examples, the four quadcopters 2*a-d* may be also positioned and operated to cause the aerial vehicle 1 to hover but with the downwash towards its interior.

Figure 5A:
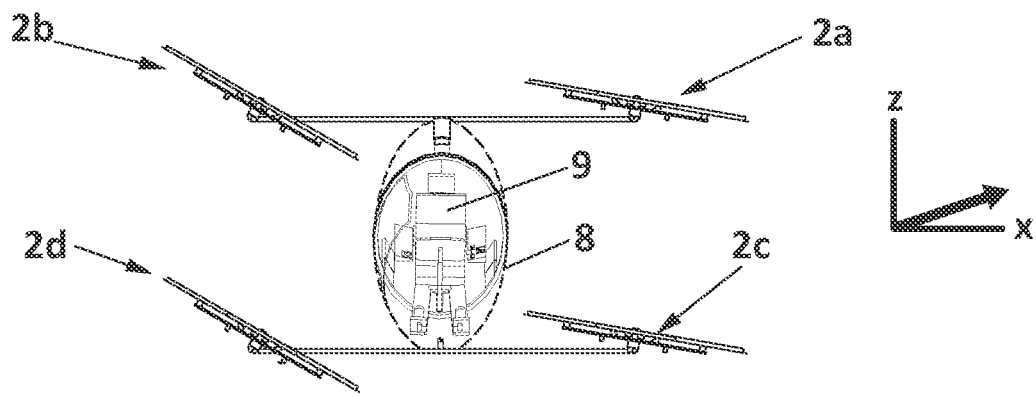
FIGS. 5A-C show a front view, a side view and a plant view of the example aerial vehicle of FIG. 1, respectively, with the four quadcopters positioned and operated to cause the aerial vehicle to move towards its right and with different thrust in its rotors.
Figure 5B:
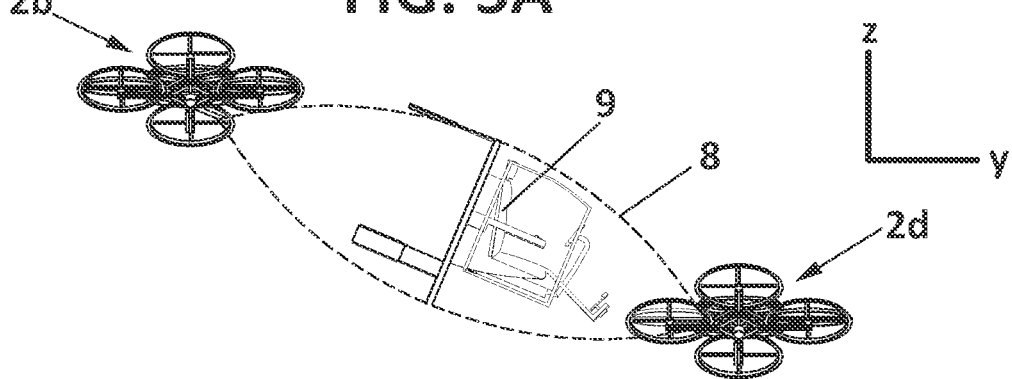
Figure 5C:
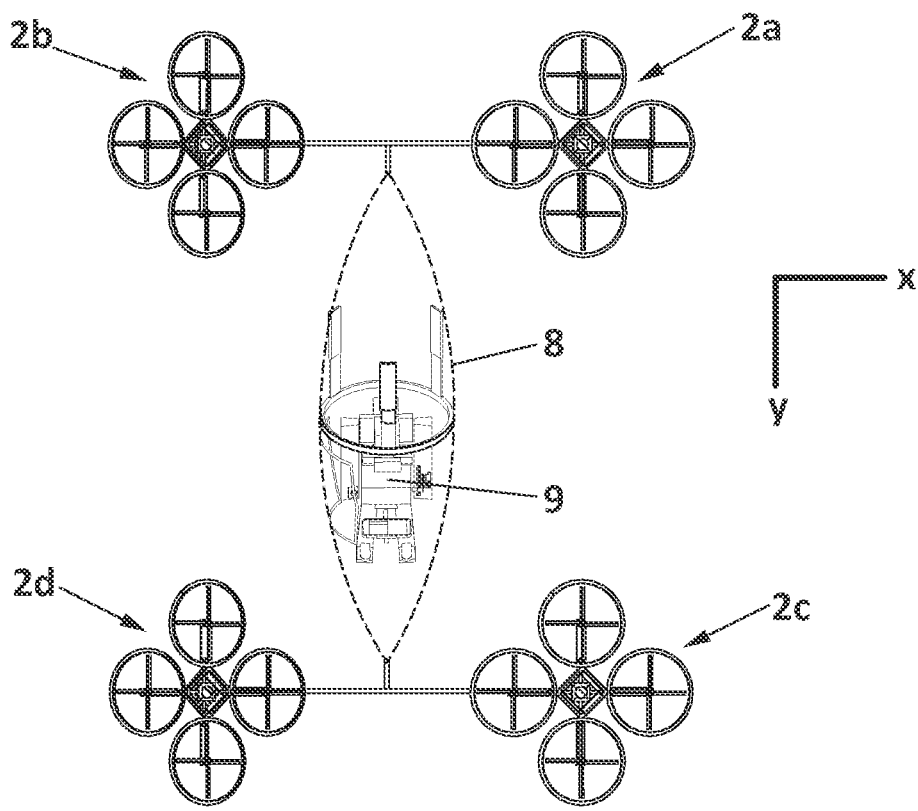

FIGS. 5A-C show a front view, a side view and a plant view of the example aerial vehicle of FIG. 1, respectively, with the four quadcopters positioned and operated to cause the aerial vehicle to move towards its right and with different thrust in its rotors.

In such example, the quadcopters 2*a* and 2*c* have a first thrust vector being inclined at a first angle relative to the horizontal plane and quadcopters 2*b* and 2*d* have a second thrust vector being inclined at a second angle relative to the horizontal plane, the first angle being smaller than the second angle. Thus, all the quadcopters 2*a-d* are positioned in a different plane but are all inclined towards the same direction, in particular towards right direction (see arrow in FIG. 5A in X-Z plane), to direct the aerial vehicle 1 in such direction. Therefore, the controller operates all the quadcopters 2*a-d* to rotate relative to their respective ball joints 4 with the tilt angle relative to the horizontal plane previously cited. The thrust of quadcopters 2*a* and 2*c* is the same and different from the thrust of quadcopters 2*b* and 2*d*.

Figure 6A:
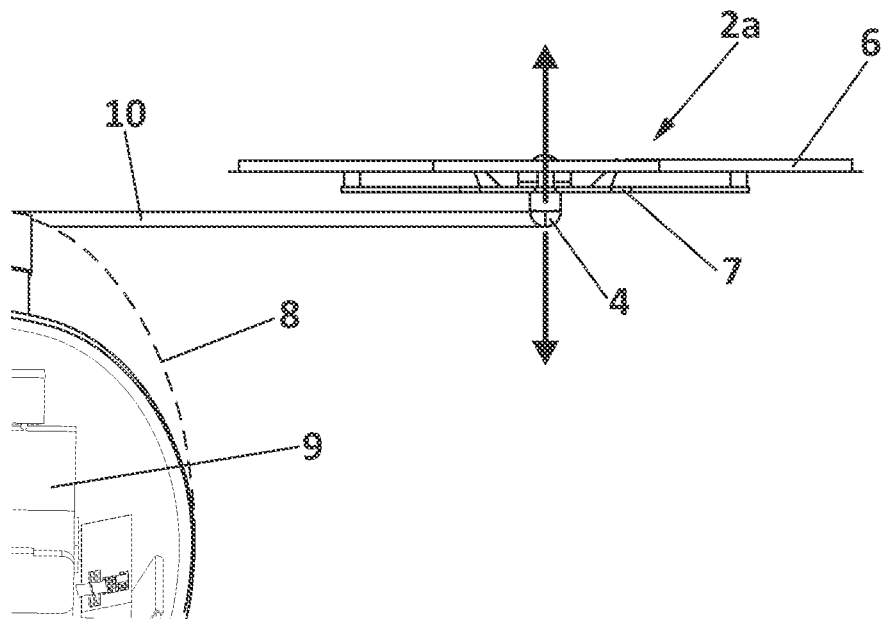
FIG. 6A shows a detailed view of one of the quadcopters of FIG. 1 with said quadcopter pulling from the arm of the aerial vehicle (stable equilibrium).
Figure 6B:
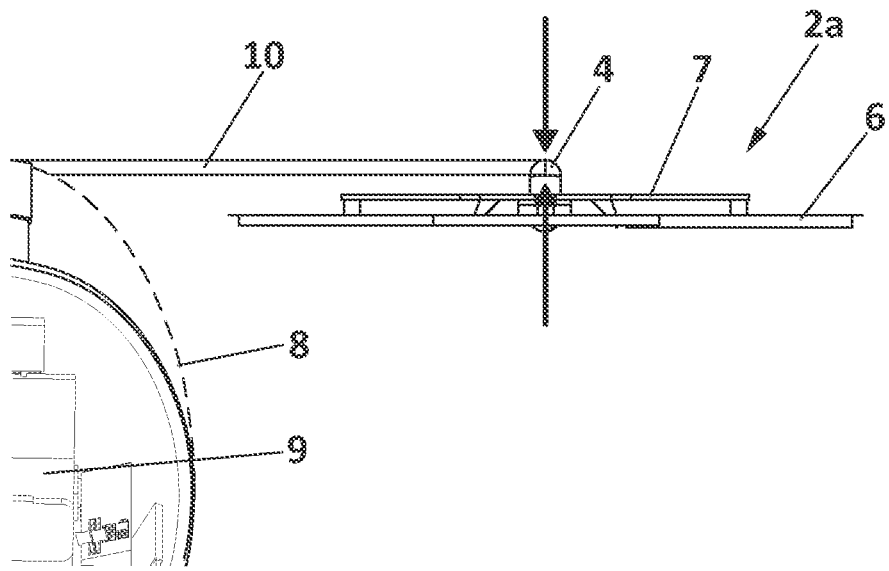
FIG. 6B shows a detailed view of one of the quadcopters of FIG. 1 with said quadcopter pushing the arm of the aerial vehicle (unstable equilibrium).

FIG. 6A shows a detailed view of one of the quadcopters of FIG. 1 with said quadcopter pulling from the arm of the aerial vehicle (stable equilibrium). In such example, the quadcopter 2*a* is positioned in an upper plane relative to the arm 10 of the main frame 3 such that the arm 10 is pulled via the ball joint 4. Therefore, the thrust (arrow up) generated by the quadcopter 2*a* pulls the aerial vehicle vertically and upwardly while gravity (arrow down) push the aerial vehicle 1 down. FIG. 6B shows a detailed view of one of the quadcopters of FIG. 1 with said quadcopter pushing the arm of the aerial vehicle (unstable equilibrium). In such example, the quadcopter 2*a* is positioned in a lower plane relative to the arm 10 of the main frame 3 such that the arm 10 is being pushed via the ball joint 4. Therefore, the thrust (arrow up) generated by the quadcopter 2*a* pushes the aerial vehicle 1 vertically and upwardly while gravity (arrow down) push the aerial vehicle 1 down.

Although FIGS. 6A and 6B show the quadcopter 2*a* connected to the main frame 3 by interposition of a ball joint 4, any joint with a maximum of three DOF relative (e.g., a spherical joint) to the given rotational point and a minimum of one DOF relative to the given rotational point (e.g., a hinge joint) being in its pull or push configurations, i.e. with the joint pulling the quadcopter or with the joint being pushed by the quadcopter, could be used. Pull configuration is a more stable configuration since the equilibrium of forces (thrust and gravity) is in a stable equilibrium while the push configuration is the most unstable as the equilibrium of forces is in an unstable equilibrium.

Figure 7:
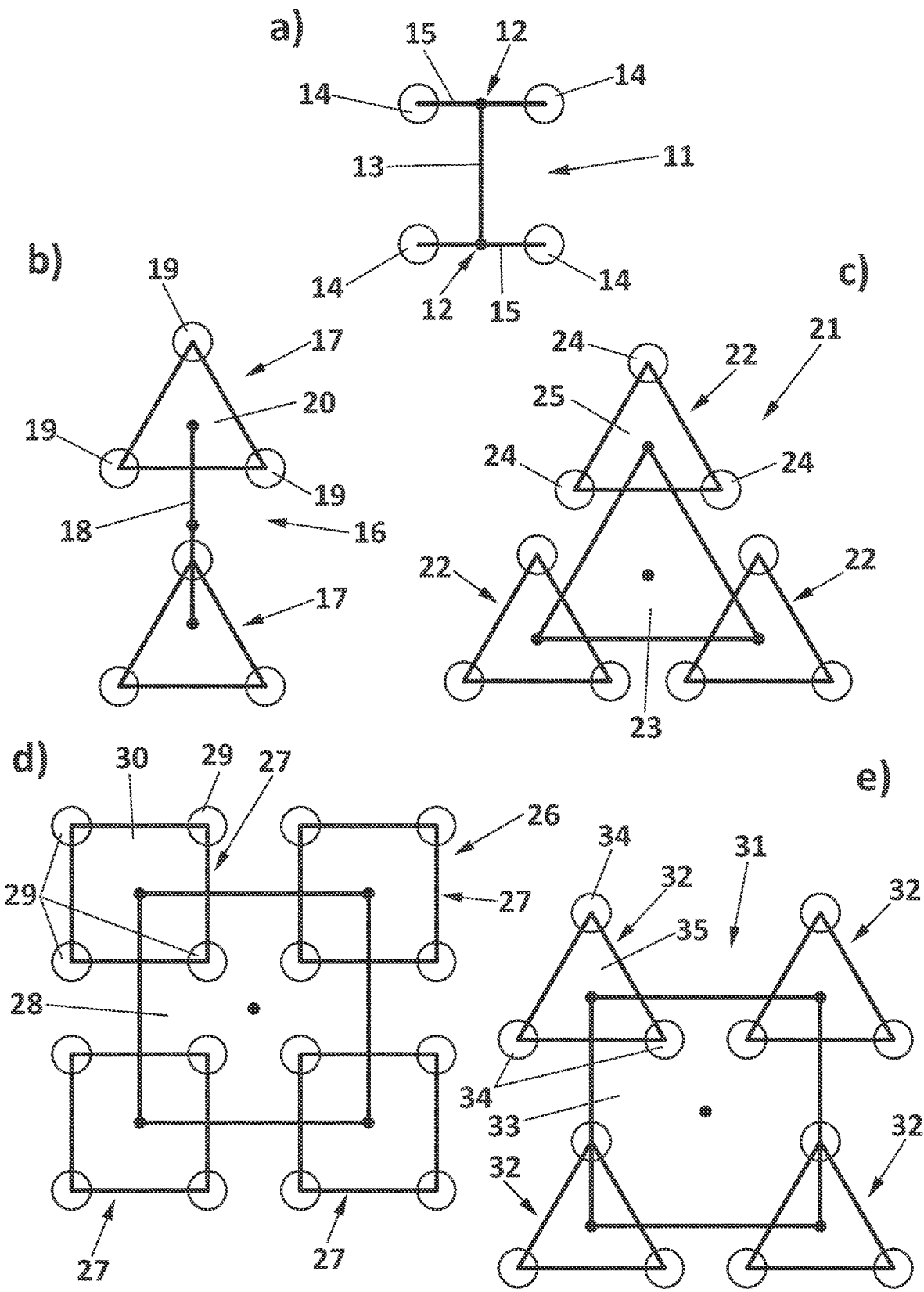
FIG. 7 shows plan schematic views of different example aerial vehicle architectures with uncoupled DOF.

FIG. 7 shows plan schematic views of different example aerial vehicle architectures. In such schematic views five different architectures are shown. It should be understood that the example aerial vehicle architectures may include additional components and that some of the components described herein may be removed and/or modified without departing from a scope of the example aerial vehicle architectures. Additionally, implementation of example aerial vehicle architectures is not limited to such example as shown in FIG. 7.

Multiple combinations between the number of multicopters and the number of propulsion units (e.g. rotors, turboprop engines, jet engines, etc.) arranged on each multicopter unit would be possible. Thus, it would be possible to combine different aerial vehicle architectures according to the following formula that gives the number of total propulsion units in the multicopter unmanned aerial vehicle:

$$Np = N \times A$$

where "Np" is the number of propulsion units, "N" is the number of multicopter units (at least two multicopter units) attached to the main frame of the aerial vehicle and "A" is the number of propulsion units (at least two propulsion units) that each multicopter has. For example, with N=4 and A=4 the aerial vehicle is a quadcopter (a main frame with four multicopter units) of quadcopters (each multicopter unit has four propulsion units attached thereto), and with N=3 and A=4 the aerial vehicle is a tricopter (a main frame with three multicopter units) of quadcopters (each multicopter unit has four propulsion units attached thereto).

A first architecture a) corresponds to a bicopter of bicopters (N=2 and A=2). Thus, the aerial vehicle 11 is formed by two bicopters 12 attached to the main frame 13 by interposition of spherical joints. In such architecture the main frame 13 may be an elongated body with the two bicopters 12 attached in proximity to its respective ends. Each bicopter 12 has tree propulsion units 14 attached to their respective bodies 15.

A second architecture b) corresponds to a bicopter of tricopters (N=2 and A=3). Thus, the aerial vehicle 16 is formed by two tricopters 17 attached to the main frame 18 by interposition of spherical joints. In such architecture the main frame 18 may be an elongated body with the two tricopters 17 attached in proximity to its respective ends. Each tricopter 17 has tree propulsion units 19 attached to their respective bodies 20.

A third architecture c) corresponds to a tricopter of tricopters (N=3 and A=3). Thus, the aerial vehicle 21 is formed by three tricopters 22 attached to the main frame 23 by interposition of spherical joints. In such architecture the main frame 23 may be a substantially triangular body with the three tricopters 22 attached in proximity to its corners. Each tricopter 22 has tree propulsion units 24 attached to their respective bodies 25.

A fourth architecture d) corresponds to a quadcopter of quadcopters (N=4 and A=4). Thus, the aerial vehicle 26 is formed by four quadcopters 27 attached to the main frame 28 by interposition of spherical joints. In such architecture the main frame 28 may be a substantially quadrangular body with the four quadcopters 27 attached in proximity to its respective corners. Each quadcopter 27 has four propulsion units 29 attached to their respective bodies 30.

A fifth architecture e) corresponds to a quadcopter of tricopters (N=4 and A=3). Thus, the aerial vehicle 31 is formed by four tricopters 32 attached to the main frame 33 by interposition of spherical joints. In such architecture the main frame 33 may be a substantially quadrangular body with the four tricopters 32 attached in proximity to its respective corners. Each tricopter 32 has tree propulsion units 34 attached to their respective bodies 35.

In such example, all the architectures may comprise ball joints or spherical joints with three DOF to provide redundant CDOF to the aerial vehicles. Other architectures and geometries of the aerial vehicle may be envisaged. The architectures described in such example are, however, merely an indicative example multicopter unmanned aerial vehicle architectures, and may other alternative architectures and geometries be considered.

Figure 8:
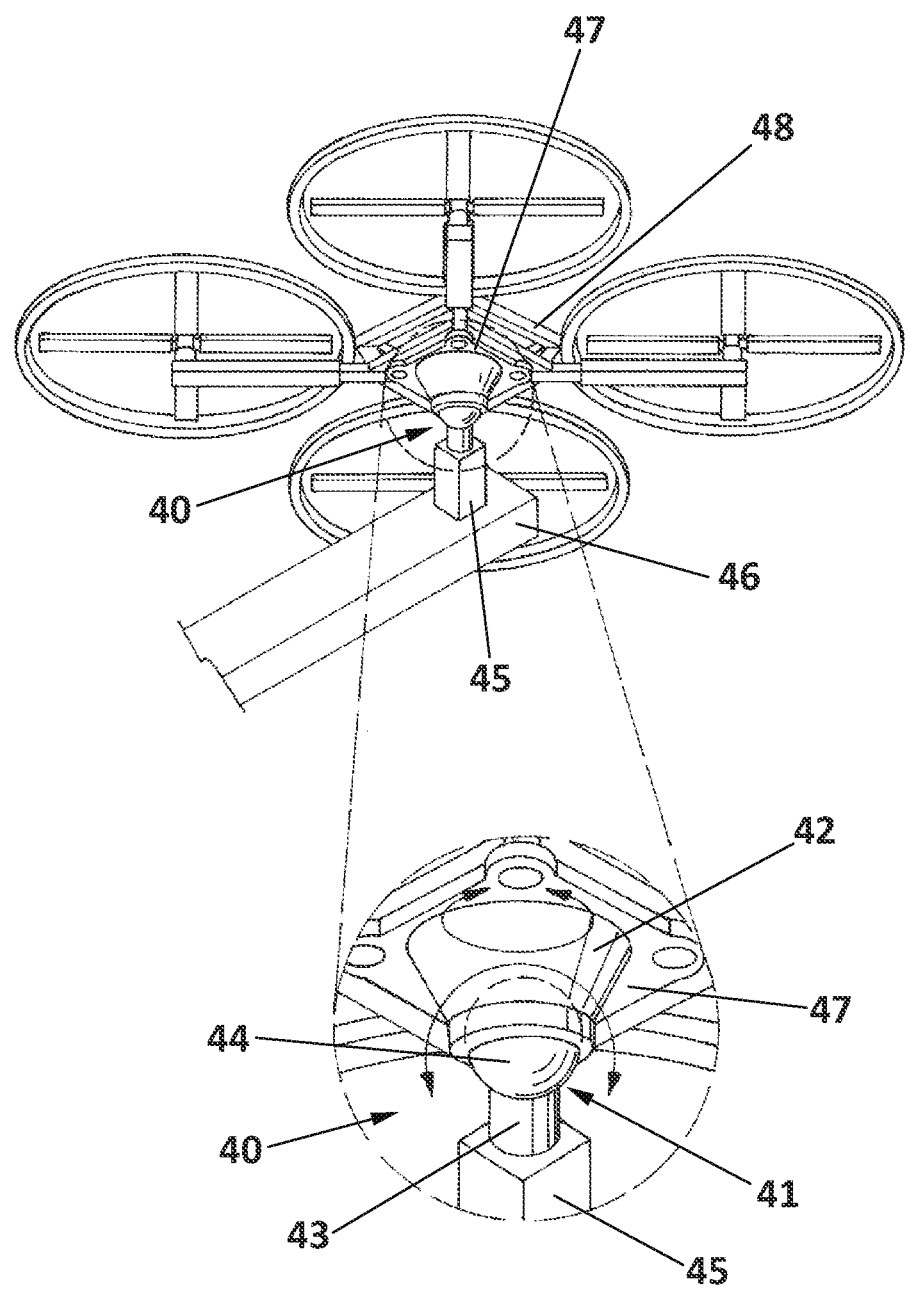
FIG. 8 shows an example spherical joint assembly to attach a particular quadcopter to an arm of the main frame of an example aerial vehicle with uncoupled DOF.

FIG. 8 shows an example spherical joint assembly 40 to attach a particular quadcopter 48 to an arm 46 of the main frame of an example aerial vehicle with uncoupled DOF. As used herein, a spherical joint may refer to any joint that allows free rotation in two planes at the same time while preventing translation in any direction. It should be understood that the example spherical joint assembly 40 may include additional components and that some of the components described herein may be removed and/or modified without departing from a scope of the example spherical joint assembly 40. Additionally, implementation of example spherical joint assembly 40 is not limited to such example as shown in FIG. 8. The joint assembly 40 of FIG. 8 also shows a particular example of a release system 70 such that the corresponding quadcopter 48 is releasably attached to the main frame.

In such example, the spherical joint assembly 40 is a ball joint assembly formed by a ball stud 41 and a housing 42. The housing 42 has an open bore in which the ball stud 41 is inserted. The ball stud 41 has a shank portion 43 and a ball portion 44. The ball portion 44 has a semi-spherical shape and is received in the open bore of the housing 42 such that the shank portion 43 projects out of the open bore. The shank portion 43 is attached to a protrusion 45 of the arm 46 of the main frame of the aerial vehicle. The housing 42 integrates blocking means 71 configured to temporarily block movement of the joint in at least one degree of freedom and locking means 72 configured to restrict movement of the joint in at least one degree of freedom.

The housing 42 is formed in a socket portion 47 of the ball joint assembly 40. This socket portion 47 is coupled to the main body of the quadcopter 48. For example, screws may be used to attach the socket portion to the main body of the quadcopter 48.

This spherical joint assembly 40 allows movements that will be determined by the sum of forces generated by the quadcopter 48 attached to it. The spherical joint assembly allows varying the relative position of the quadcopter and thus, provides the aircraft with additional mobility and independent DOF by combining the different forces generated by the plurality of multicopters attached to the main frame via the spherical joints.

In some examples, the spherical joints may incorporate mechanism to restrict one or more DOF. For example, in an aerial vehicle for transporting people it might be unnecessary to have all DOF of the spherical joint, as for example the operation mode of moving the aerial vehicle backwards at maximum speed. In this case, the spherical joint could have a mechanical system, such as a bolt or latch, to restrict the tilt backwards. The joint may further comprise a remote-control system to activate the mechanical system for restricting specific DOF. These restricting mechanisms may be also useful in operation modes where the controllability or safety requirements are higher (e.g. at landing). For example, during an emergency landing some of the DOF of the spherical joints may be blocked to maintain the spherical joints perpendicular to the ground.

The spherical joints may also have additional elements to provide additional functionalities. For example, shock absorbing mechanisms 49 for variable damping the forces exerted on the joint during movement of the aerial vehicle, force generation mechanisms for generating an opposing and variable force in the kneecap of the joint when making the movement and force generation mechanisms to generate a variable force to the joint when it reaches its mechanical limits (bump stop), among others.

Thus, using joints with at least one DOF to attach the multicopter units to the main frame provides independent DOF without having to add servo-actuators to the architecture. Besides, the weight and the electronics associated to the servo-actuators is avoided at the same time that energy consumption is reduced.

FIG. 9 shows an example control system 50 for managing the aerial vehicle of FIG. 1. It should be understood that the example control system 50 may include additional components and that some of the components described herein may be removed and/or modified without departing from a scope of the example control system 50. Additionally, implementation of example control system 50 is not limited to such example as shown in FIG. 9.

In such example, the control system 50 comprises a controller 51 which is communicatively coupled to a referencing processing unit 52 that determines displacement of the main frame 3 with respect to a horizontal plane. The referencing processing unit 52 may be communicatively coupled to an inertial measurement unit 53. In turn, said inertial measurement unit 53 is also communicatively coupled a plurality of accelerometers 54 and/or gyroscopes 55 positioned on different locations on the main frame 3 to measure parameters such as acceleration, orientation, angular velocity, etc. As used herein, the referencing processing unit 52 may be any combination of software and hardware configured to perform the described functionalities of the referencing processing unit.

If the aerial vehicle 1 is remotely controlled, the controller 51 may be further communicatively coupled to a transceiver configured to receive instructions from a remote control to pilot the aircraft. Alternatively, if the aerial vehicle 1 is an autonomous aircraft, the controller may be coupled to an autopilot processing unit comprising software and hardware to perform the autonomous flight.

The controller 51 is configured to receive the current orientation of the main frame 3 from the referencing processing unit 52. Based on the current orientation of the main frame 3, a current thrust and the intended thrust and direction of travel, the primary controller determines a thrust magnitude for each one the motors 56 associated to the propulsion units (e.g. rotors). The controller 52 sends the calculated thrusts to the speed processing unit 57. The speed processing unit 57, which is in communication with each one of the motors 56 of the quadcopters 2a-d, sends the corresponding relay signals to the respective motors in the quadcopters 2a-d that will determine their rotor speed. By modifying the thrust magnitude of the different propulsion units, the position of the quadcopters 2a-d relative to the main frame 3 will be modified.

FIG. 11 shows the same example control system of FIG. 9 but with a primary controller 51 located in the main frame 3 and a plurality of secondary controllers 58, each secondary controller 58 being located in a corresponding multicopter unit 2a-d. Besides each multicopter unit 2a-d may have its own speed processing unit. With such control system architecture, the secondary controllers are configured to operate the respective multicopter units 2a-d and the primary controller 51 is configured to manage the plurality of secondary controllers 58. This primary controller 51 is communicatively coupled to the referencing processing unit 52 to receive information about the orientation of the main frame 3 while the secondary controllers 58 are communicatively coupled to the primary controller 51. In this way, the primary controller 51 with the information about the current orientation, current direction of travel and the intended direction of travel of the aerial vehicle is able to determine a direction to be taken by the aerial vehicle. The primary controller 51 may transmit the direction to be taken, i.e., the thrust vector for the aerial vehicle, to the secondary controllers 58 such that each secondary controller 58 may operate the respective multicopter unit 2a-d to direct the aerial vehicle in the direction to be taken. Each secondary controller 58 may send the calculated thrust for that particular quadcopter 2a-d to the corresponding speed processing unit. The speed processing unit may send the corresponding relay signals to the respective motors in the quadcopters that will determine their rotor speed.

Figure 10:
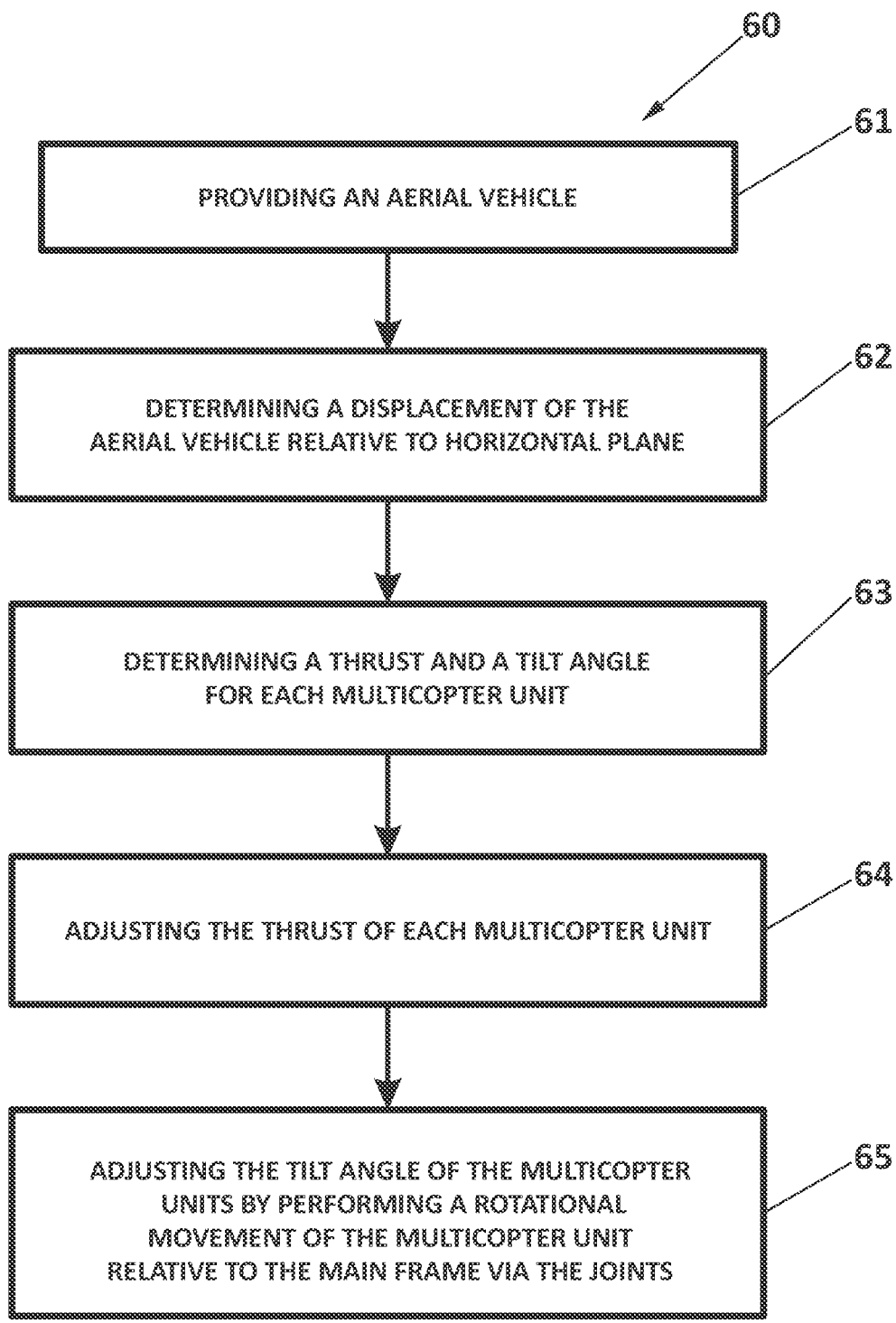
FIG. 10 shows a flow diagram of an example method for manoeuvring an aerial vehicle with uncoupled DOF.

FIG. 10 shows a flow diagram of an example method for manoeuvring an aerial vehicle with uncoupled DOF.

At step 61 of the method 60, an aerial vehicle with uncoupled DOF as previously disclosed is provided. This aerial vehicle comprises a main frame, a plurality of multicopter units attached to the main frame by interposition of respective joints, where at least one joint has a minimum of one degree of freedom, such that the main frame has the same or a higher number of CDOF than a total number of DOF of the main frame.

At step 62 of the method, the referencing processing unit of the aerial vehicle determines a displacement of the aerial vehicle relative to a horizontal plane. Preferably, the referencing processing unit may be communicatively coupled to an inertial measurement unit and a plurality of accelerometers and/or gyroscopes positioned on the main frame.

At step 63 of the method 60, a controller of the aerial vehicle determines a global thrust vector or setpoint (thrust+ tilt angles, yaw, roll and pitch) for the entire aerial vehicle based on the determined displacement. Then, the controller calculates a thrust vector (thrust and a tilt angles) for each one of the plurality of multicopter units based on the global thrust vector previously calculated.

At step 64 of the method 60, the controller adjusts the thrust of each propulsion unit of the plurality of multicopter units based on the determined thrust.

At step 65 of the method 60, the controller adjusts the tilt angle of the plurality of multicopter units by performing a rotational movement of each multicopter units relative to the main frame via the joints, the relative rotational movement being based on the determined tilt angle.

Aerial vehicles with uncoupled DOF as described herein may be useful for providing scalable aircraft architectures based on minimum propulsion modules that are joined to a common structure by joints with at least one DOF and up to three DOF of rotation. These joints linking each multicopter unit to the main aircraft structure can allow up to 3 degrees of rotational freedom (X-turn, Y-turn and Z-turn) and enable the precise positioning of each of the multicopter units relative to the main aircraft structure. All these benefits enable the aircraft to perform movements that currently cannot be performed by existing aircrafts with fixed propulsion units.

In this text, the term "comprises" and its derivations (such as "comprising", etc.) should not be understood in an excluding sense, that is, these terms should not be interpreted as excluding the possibility that what is described and defined may include further elements.

The invention is obviously not limited to the specific embodiments described herein, but also encompasses any variations that may be considered by any person skilled in the art within the general scope of the invention as defined in the claims.

The invention claimed is:

1. An aerial vehicle comprising:
   a main frame;
   a plurality of operable multicopter units, each multicopter unit having a plurality of propulsion units, wherein the plurality of propulsion units are attached to the multicopter unit at a fixed yaw angle, a fixed roll angle and a fixed pitch angle; and
   wherein the main frame has a plurality of arms fixedly coupled thereto and extending radially therefrom and each operable multicopter unit of the plurality of operable multicopter units is attached to a respective arm of the main frame by interposition of one single joint such that the multicopter units rotate relative to the main frame independently of one another, and where at least one of the single joints has a minimum of one degree of freedom, such that the main frame has the same or a higher number of controllable degrees of freedom than a total number of degrees of freedom of the aerial vehicle;
   the aerial vehicle further comprising a referencing processing unit located on the main frame and configured to determine a displacement of the main frame relative to a horizontal plane.

2. The aerial vehicle according to claim 1, wherein each joint has a maximum of three degrees of freedom of the total number of degrees of freedom.

3. The aerial vehicle according to claim 1, wherein each joint comprise a release system such that the plurality of operable multicopter units are releasably attached to the main frame.

4. The aerial vehicle according to claim 1, further comprising a controller located in the main frame configured to operate of the plurality of multicopter units.

5. The aerial vehicle according to claim 1, further comprising:
   a primary controller located in the main frame; and
   a plurality of secondary controllers, each secondary controller being located in a corresponding multicopter unit;
   wherein the plurality of secondary controllers is configured to operate the respective multicopter units and the primary controller is configured to manage the plurality of secondary controllers.

6. A method for manoeuvring an aerial vehicle, comprising:
   providing an aerial vehicle as claimed in claim 1;
   determining, by the referencing processing unit, a displacement of the aerial vehicle relative to a horizontal plane;
   determining, by a controller of the aerial vehicle, a thrust and a tilt angle for the aerial vehicle based on the determined displacement;
   adjusting, by the controller, the thrust of each one of the plurality of multicopter units based on the determined thrust; and
   adjusting, by the controller, the tilt angle of each one the plurality of multicopter units by performing a rotational movement of each multicopter unit relative to the main frame via each joint, the relative rotational movement being based on the determined tilt angle.

7. The method according to claim 6, wherein the aerial vehicle has a primary controller attached to the main frame and a secondary controller attached to each multicopter unit, wherein the plurality of secondary controllers are to operate the respective multicopter units and the primary controller is to manage the plurality of secondary controllers, the method comprising:
   determining, by the primary controller, the thrust and the tilt angle for the aerial vehicle based on the determined displacement;
   adjusting, by each secondary controller, the thrust of the respective multicopter unit based on the determined thrust; and
   adjusting, by each secondary controller, the tilt angle of the respective multicopter unit by performing a rotational movement of the multicopter unit relative to the main frame via each joint, the relative rotational movement being based on the determined tilt angle.

8. The method according to claim 6, wherein the aerial vehicle has a plurality of controllers configured to operate the plurality of multicopter units, the method comprising:
   determining, by each controller of the plurality of controllers, the thrust and the tilt angle for the aerial vehicle based on the determined displacement;
   adjusting, by each controller of the plurality of controllers, the thrust of the plurality of multicopter units based on the determined thrust; and
   adjusting, by each controller of the plurality of controllers, the tilt angle of the plurality of multicopter units by performing a rotational movement of the multicopter units relative to the main frame via each joint, the relative rotational movement being based on the determined tilt angle.

* * * * *